Nov. 29, 1938. C. E. EVANS 2,138,092
ANIMAL TRAP
Filed May 10, 1937 2 Sheets-Sheet 1

INVENTOR.
CHARLES E. EVANS.
BY John C. Baisch
ATTORNEY.

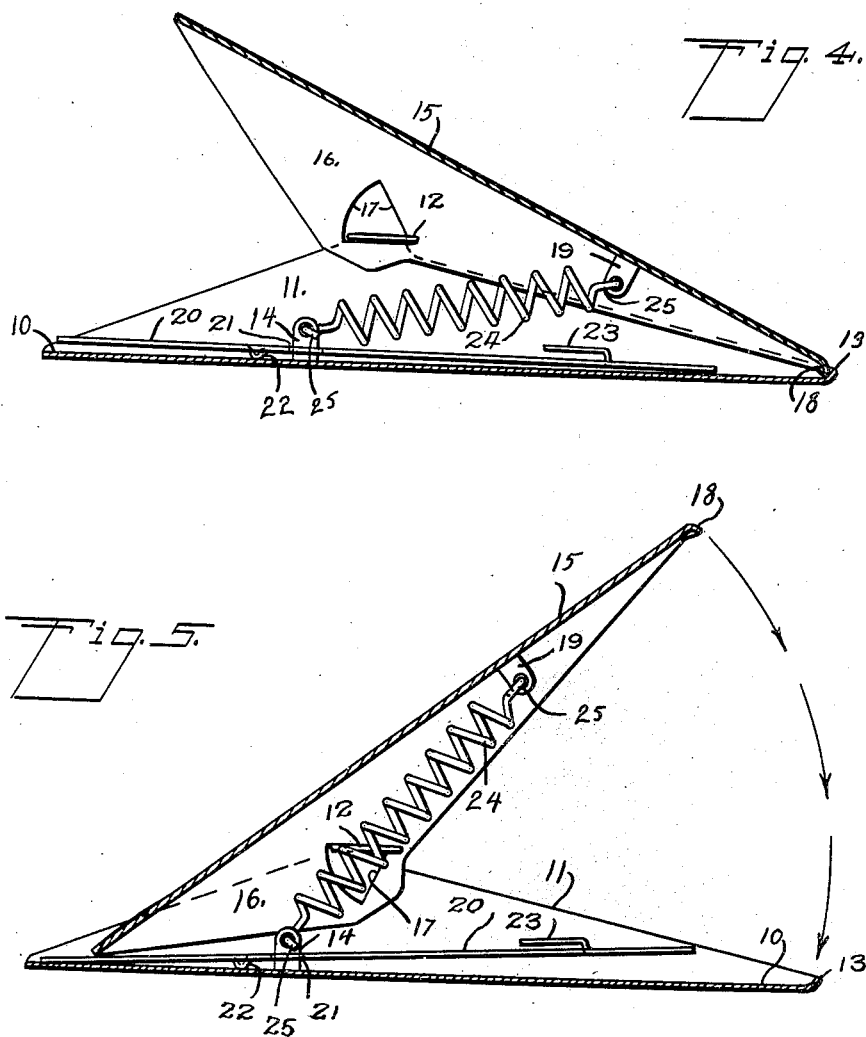

Patented Nov. 29, 1938

2,138,092

UNITED STATES PATENT OFFICE 2,138,092

ANIMAL TRAP

Charles E. Evans, Council Bluffs, Iowa

Application May 10, 1937, Serial No. 141,799

3 Claims. (Cl. 43—83)

My invention relates to animal traps, and particularly to traps adapted for household use, such as the trapping of mice.

It is an important object of my invention to provide a simple, inexpensive, durable and sanitary trap, which may be made entirely of metal.

It is another object of my invention to provide a device of this character that may be quickly and easily set by merely pressing upon portions thereof remote from the jaws, whereby to avoid any possibility of injury to the user by accidental closing of the jaws during the setting operation.

Another object of my invention is to provide a trap of this character, which, when set, forms an enclosure with an opening for the animal to enter to positively snap the trap and catch said animal.

Another object is to provide a trap of this character wherein the animal must enter from the front end thereof and snap the device.

A further object is to provide a trap of this character from which the body of a trapped animal may be released without touching the carcass.

A still further object is to provide a device of this character made from a minimum number of sheet-metal parts which may be economically produced and easily assembled, without the use of pins, bolts, rivets, or other fastening means and in which the pivotal connection or fulcrum of the jaw-members is formed by parts integral therewith.

Numerous other objects and advantages of this invention will be apparent as it is better understood from the following detailed description, which, taken in connection with the accompanying drawings, discloses a preferred embodiment thereof.

Referring to the drawings:

Figure 4 is a vertical longitudinal section taken on line 4—4 of Figure 2, showing the jaw-members closed.

Figure 5 is a vertical longitudinal section taken on line 5—5 of Figure 2 showing the jaw-members open and the trap in its set position.

Figures 1, 2, 3:
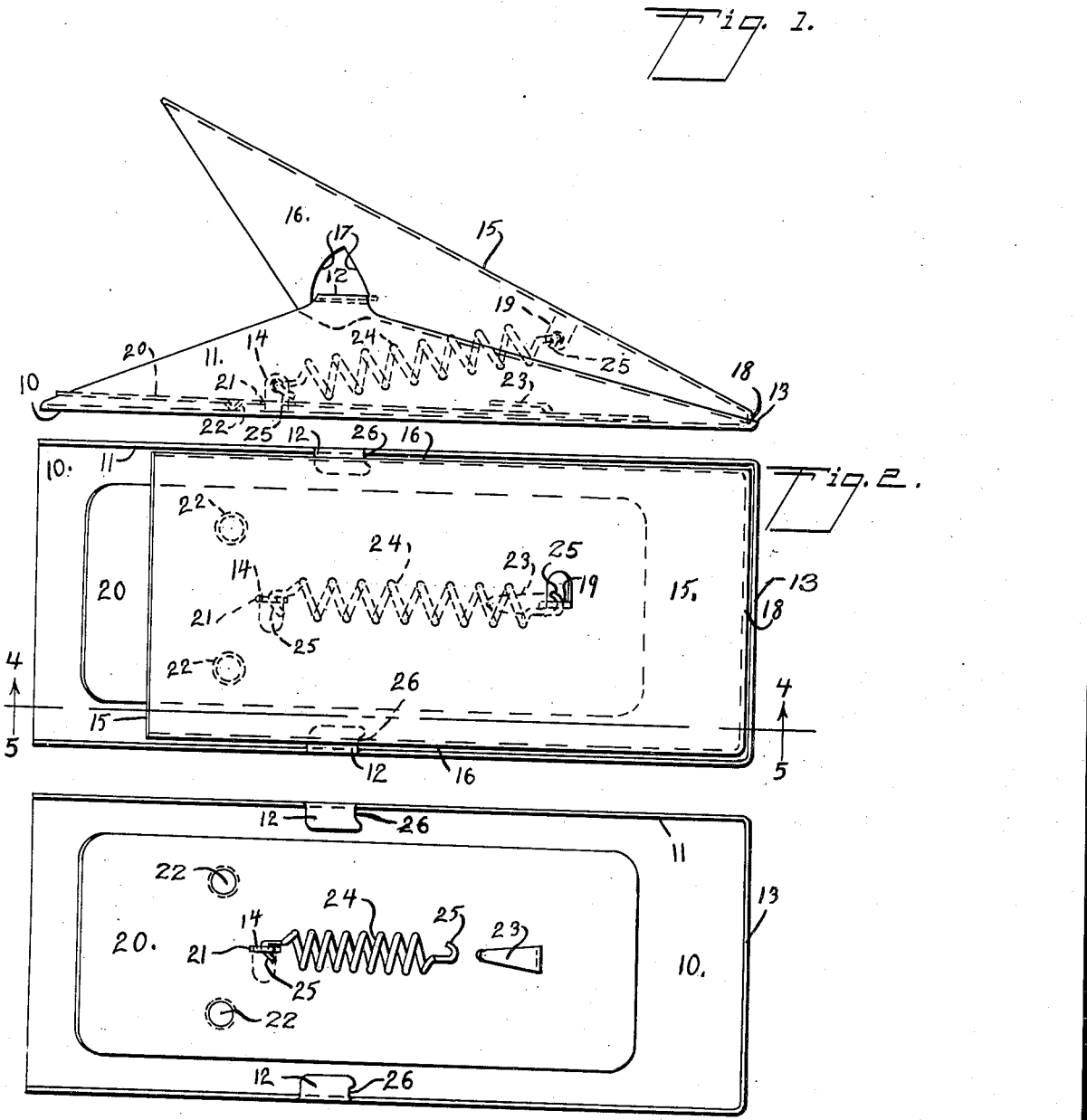
Figure 1 is a side view of a trap embodying my invention, the jaw-members being in closed position.
Fig. 2 is a plan view of the same.
Figure 3 is a plan view of the lower jaw-member with the trigger connected thereto, the upper jaw-member being removed.

In carrying out my invention according to the illustrated embodiment thereof, I provide a lower or base jaw-member, formed integrally of sheet-metal, and comprising a substantially rectangular plate 10 having symmetrical upwardly extending flanges 11 at the longitudinal edges thereof, said flanges being deepest at intermediate portions thereof and tapering toward the ends of the plate, there being a fulcrum-lug 12 extending inwardly from the upper portion of each side-flange 11, a short flange 13 being turned upwardly at the front end of the plate, and a perforate tongue 14 being cut from the rear central portion of the plate and turned upwardly therefrom, said tongue having a slight transverse curvature longitudinally of the plate, as shown.

An upper jaw-member is likewise formed integrally of sheet-metal, and comprises a substantially rectangular plate 15 having longitudinal downwardly extending symmetrical side-flanges 16 tapering toward the ends of the plate from deep rounded intermediate portions in which are formed sector-shaped openings 17, the front end of the plate having thereon a short downwardly turned flange 18, and there being a perforate tongue 19 cut from the front central portion of the plate and turned downwardly, said tongue having a slight transverse curvature similarly to the tongue 14 of the lower jaw-member.

The width of the plate 15, and the transverse spacing of the flanges 16, is such that the latter may be straddled by and fit loosely between the upturned flanges 11 of the lower jaw-member, and the sheet-metal of which the jaw-members are formed is sufficiently resilient to enable assembling of the jaw-members by first inserting one of the fulcrum-lugs 12 through one of the openings 17 while the members are in a laterally tilted or angular relation, then slightly springing the flanges 11 outwardly and the flanges 16 inwardly, until the flange 16 at the unconnected side will pass the respective fulcrum-lug and allow the lug to enter the opening 17 of the flange.

A third integral sheet-metal element of the trap structure is a substantially rectangular trigger-plate 20, of a width such as to fit loosely between the side-flanges 11 of the lower jaw-member, said plate 20 having in the rear central portion thereof a longitudinal slot 21 through which the tongue 14 may extend loosely, there being transversely alined semi-spherical lugs 22 swaged downwardly from the plate on opposite sides and slightly in back of the slot 21, and there being a tongue 23 cut from the front central portion of the plate and upwardly offset therefrom to form a bait-holder.

In the assembled relation of the parts the lugs 22 rest upon the base-plate 10 to support the trigger-plate tiltably thereon, and said trigger-plate is held in place longitudinally and transversely by the engagement of the lug 14 in the slot 21. Upward displacement of the trigger-plate from said lug 14 is prevented by the coil spring 24 which has hooked end-portions 25 engaged pivotally in the perforations of the tongues 14 and 19, as shown. The tension of said spring 24 tends to pull the upper jaw-member rearwardly, relative to the base or lower jaw-member, and the front edges of the fulcrum-lugs 12 have small notches 26 therein adjacent to the inner sides of the flanges 11, so that the tension of the spring normally holds in said notches 26 the portions of the flanges 16 at the apices of the sector-shaped openings 17.

The engagement of said flange-portions in the notches 26 prevents accidental inward displacement of the flanges 16, such as to disengage the same from the fulcrum-lugs, but should it be desired to disconnect the parts, the upper jaw-member may be pulled forwardly against the tension of the spring 24 sufficiently to displace the flange-portions from the notches 26, after which the side-flanges of the jaw-members may be sprung apart sufficiently to displace the fulcrum-lugs from the openings 17.

In the assembling of the parts to form the complete trap, the trigger-plate 20 is first disposed upon the base-plate 10, with the tongue 14 extending up through the slot 21, then the hook 25 at one end of the spring 24 is engaged in the perforation in said tongue 14, then the hook 25 at the other end of the spring is engaged in the perforation of the tongue 19 on the upper jaw-member, and finally the fulcrum-elements of the jaw-members are connected as previously described.

Another way in which the jaw-members may be assembled to establish the fulcrum connection thereof, is by disposing the rounded intermediate portions of the flanges 16 between the flanges 11 rearwardly of the fulcrum-lugs, and then pulling the upper jaw-member forcibly forward. The rear ends of the fulcrum lugs 12 are rounded or inclined, so that, in the last described assembling operation, when the edges of the flanges 16 engage said rounded or inclined ends of the lugs, there is a wedging effect, tending to force the flanges 11 outwardly and the flanges 16 inwardly, until the latter have been moved forwardly sufficiently to enable the lugs 12 to enter the openings 17. It will be seen that in the assembled relation of the parts the fulcrum or pivotal axis of the jaw-members extends transversely thereof at the apices of the sector-shaped openings 17, and is coincident with the engaged edges of the lugs 12 at the rear or inner ends of the notches 26 in said lugs.

The relation of the perforations in the tongues 14 and 19 to said fulcrum or pivotal axis of the jaw-members, is such that the tension-axis (or line upon which the pull of the spring 24 is exerted between the tongues 14 and 19) is caused to intersect said fulcrum-axis as the jaw-members are moved pivotally from the closed position, shown in Figures 1, 2 and 4, to the open or set position shown in Figure 5. In the open position the tension-axis is slightly above the fulcrum-axis, as the dead-center or intersecting relation of the axes occurs just prior to completion of the jaw-opening movement. In the open position of the jaw-members the rear end of the upper jaw-plate 15 engages and presses downwardly the rear portion of the trigger-plate 20, so that said plate is tilted about the rounded ends of the pivot-lugs 22, and the front portion of the trigger-plate is correspondingly raised. A very slight pressure upon the raised front portion of the trigger-plate serves to tilt the same about the pivot-lugs 22, causing the rear portion of the trigger-plate to lift the rear end of the upper jaw-plate sufficiently to move the tension-axis past the intersecting or dead-center relation with the fulcrum-axis of the jaw-members, whereupon the spring tension is effective to cause a rapid and forcible closing of the jaws formed by the front portions of the jaw-members.

It will be seen that the operation of setting the trap consists merely in pressing toward each other the rear ends of the pivotally connected jaw-members, and that suitable bait may be readily inserted in the holder formed by the offset tongue 23, while holding the jaws open by pressure upon the rear portions of the pivoted jaw-members. The animal seeking the bait enters the open jaws, and by pressing upon the front portion of the trigger-plate lifts the rear portion of the trigger-plate and of the upper jaw-member, the movement of the latter causing the tension-axis to cross the dead-center position, whereupon the jaws are released and close upon the animal, which is caught and held securely between the opposing edges of the flanges 11, 13, 16 and 18.

The forcible closing of the jaws upon the head, neck or front portion of the body of the animal, is usually effective to cause its immediate death and avoid any prolonged pain or suffering of the same. Removal of the trapped animal from the jaws is effected without touching the carcass, by merely pressing together the rear ends of the jaw-members, and the same operation serves to re-set the trap for further use. The trap, being entirely of metal, is non-absorbent and sanitary, and may be thoroughly cleansed and sterilized by means such as a flame or boiling water, without injury thereto, and without causing expansion, shrinkage or warping of its parts.

It is thought that the invention and many of its attendant advantages will be readily understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

Having thus described my invention what I claim is:

1. In a device of the class described, a pair of jaw-members each comprising a sheet-metal plate having integral parallel side-flanges thereon, said side-flanges of one jaw-member having portions overlapping portions of the flanges of the other jaw-member, the overlapping flange-portions of one jaw-member having sector-shaped openings therein and the flange-portions of the other jaw-member having integral laterally extending fulcrum-lugs extending through said sector-shaped openings in the adjacent flange-portions of the other jaw-member to form a pivotal connection between the jaw-members, said fulcrum-lugs being notched longitudinally to receive the respective flange-portions of the other jaw-member at said openings, perforate tongues formed integrally with the respective jaw-members at longitudinally opposite sides of the pivotal axis, a tension spring having hooked ends, one end of said spring being hooked in the perforation of the tongue of the upper jaw-member and the other end of said spring being hooked in the perforation of the tongue of the lower jaw-member, the axis of tension being arranged to intersect the pivotal axis during movement of the jaw-members between an open and a closed position, said tension spring normally holding the flange-portions of one jaw-member in the notches of the fulcrum-lugs thereby preventing relative lateral displacement of the engaged parts, a trigger-plate supported pivotally upon the tongue of the lower jaw-member beneath the respective hook of the spring, said trigger-plate having a portion engaged by the other jaw-member at the open position thereof, and downwardly extending lugs on the trigger-plate whereon the trigger-plate is tiltable to actuate the upper jaw-member toward the closed position, said trigger-plate being adapted to move the tension axis past the position of intersection of the pivotal axis therewith.

2. In a device of the class described, a pair of jaw-members each comprising a sheet-metal plate having integral parallel side-flanges thereon, said side-flanges of one jaw-member having portions overlapping portions of the flanges of the other jaw-member, the overlapping flange-portions of one jaw-member having sector-shaped openings therein and the flange-portions of the other jaw member having integral laterally extending fulcrum-lugs extending through said openings in the adjacent flange-portions of the other jaw-member to form a pivotal connection between the jaw-members, tongues formed integrally with the respective jaw-members at longitudinally opposite sides of the pivotal axis, a tension spring having its respective ends operatively attached to the tongues, the axis of tension being arranged to intersect the pivotal axis during movement of the jaw-members between an open and a closed position, and a trigger-plate operatively received on one of the tongues and held thereon by a portion of the spring, said trigger-plate being pivotally supported upon one jaw-member and having a portion engaged by the other jaw-member at the open position thereof, and being tiltable to actuate the latter jaw-member toward the closed position, whereby to move the tension-axis past the position of intersection of the pivotal axis therewith.

3. In a device described, a pair of jaw-members each comprising a flat plate having longitudinally extending side-flanges, said side-flanges being normally parallel and being laterally resilient to enable temporary displacement thereof from said normal parallel relation, the side-flanges of one jaw-member being spaced to straddle those of the other jaw-member, the flanges of one jaw-member having openings therein, lugs formed integrally with the flanges of the other jaw-member and extending laterally thereof for engaging pivotally in said openings, said lugs being removable from said openings during relative lateral displacement of the pairs of flanges and being restrained therein when the flanges are in normal parallel relation, tension means pivotally connected with parts of said jaw-members and extending across the pivotal axis of the jaws and in the direction of the length of the jaws, the axis of tension being arranged to intersect the pivotal axis during movement of the jaw-members between an open and a closed position, and a trigger-plate supported pivotally upon one jaw-member and having a portion engaged by the other jaw-member at the open position thereof, said trigger plate being tiltable to actuate the latter jaw-member toward the closed position, whereby to move the tension-axis past the position of intersection of the pivotal axis therewith.

CHARLES E. EVANS.